(12) United States Patent
Rohner

(10) Patent No.: US 11,381,146 B2
(45) Date of Patent: Jul. 5, 2022

(54) DRIVE DEVICE HAVING A TUBULAR LINEAR MOTOR AND A STAINLESS STEEL CASING

(71) Applicant: NTI AG, Spreitenbach (CH)

(72) Inventor: Ronald Rohner, Widen (CH)

(73) Assignee: NTI AG, Spreitenbach (CH)

( * ) Notice: Subject to any disclaimer, the term of this patent is extended or adjusted under 35 U.S.C. 154(b) by 131 days.

(21) Appl. No.: 17/008,613

(22) Filed: Aug. 31, 2020

(65) Prior Publication Data

US 2021/0067025 A1 Mar. 4, 2021

(30) Foreign Application Priority Data

Sep. 4, 2019 (EP) ..................................... 19195400

(51) Int. Cl.
*H02K 41/03* (2006.01)
*H02K 5/02* (2006.01)
(Continued)

(52) U.S. Cl.
CPC ............. *H02K 41/031* (2013.01); *H02K 5/02* (2013.01); *H02K 5/10* (2013.01); *H02K 9/22* (2013.01); *A23P 30/00* (2016.08)

(58) Field of Classification Search
CPC .. A23P 30/00; A61J 1/05; A61J 1/065; A61M 5/178; A61M 5/3129;
(Continued)

(56) References Cited

U.S. PATENT DOCUMENTS 3,906,261 A * 9/1975 Ogura ...................... H02K 9/20
62/505
6,405,599 B1 * 6/2002 Patt .......................... G01N 3/02
73/779
(Continued)

FOREIGN PATENT DOCUMENTS

CN 104 410 197 A 3/2015
WO 2003/021741 A2 3/2003
(Continued)

OTHER PUBLICATIONS

Extended European Search Report, dated Feb. 25, 2020, for corresponding European Application No. 19195400.7, 13 pages.
(Continued)

*Primary Examiner* — Naishadh N Desai
(74) *Attorney, Agent, or Firm* — Kilpatrick Townsend & Stockton LLP

(57) ABSTRACT

In a drive device having a tubular linear motor with a stator (1), an armature (2) and a bottom flange (30), the stator (1) is arranged on the bottom flange (30) in thermal contact with the bottom flange (30). The stator (1) is fluid-tightly enclosed by stainless steel. The bottom flange (30) consists at least partly of a material having a higher thermal conductivity than stainless steel. The stator (1), together with the bottom flange (30), is enclosed by a casing (40) made of stainless steel which is in thermal contact with the bottom flange (30) and encloses the bottom flange (30) and the stator (1) in common. The stator (1) is a tubular stator (1) having drive coils (12) arranged therein and also having a longitudinal axis and a through-hole (11) which extends through the tubular stator (1) coaxially with the longitudinal axis. The armature (2) has a fluid-tight armature tube (21) made of stainless steel, in which permanent magnets (23) are arranged, and is arranged so as to be movable relative to the tubular stator (1) in the through-hole (11) in the direction of (Continued)

the longitudinal axis. The tubular stator (1) and the bottom flange (30) are so arranged relative to one another that a portion of the tubular stator (1) is in thermal contact with the bottom flange (30).

14 Claims, 6 Drawing Sheets

(51) Int. Cl.
*H02K 5/10* (2006.01)
*H02K 9/22* (2006.01)
*A23P 30/00* (2016.01)

(58) Field of Classification Search
CPC ............ B23K 2103/54; B23K 26/0006; B23K 26/0619; B23K 26/0622; B23K 26/0823; B23K 26/38; B23K 26/402; B23K 26/53; B23K 26/702; B23K 37/0426; B23K 37/0538; B65B 3/003; C03B 33/0222; C03B 33/06; H01R 13/502; H01R 13/516; H01R 13/6691; H01R 4/2433; H01R 43/01; H01R 43/26; H02K 11/21; H02K 15/14; H02K 2207/03; H02K 2213/03; H02K 41/031; H02K 5/02; H02K 5/04; H02K 5/10; H02K 5/1672; H02K 7/08; H02K 9/22; H05K 7/1468; H05K 7/1469; H05K 7/1472; Y02P 40/57
See application file for complete search history.

(56) References Cited

U.S. PATENT DOCUMENTS

| | | |
|---|---|---|
| 8,263,088 B2 | 9/2012 | Moore et al. |
| 10,181,780 B2* | 1/2019 | Achterberg .............. H01H 1/50 |
| 2020/0048016 A1* | 2/2020 | Sinzenich ................ H02K 5/04 |

FOREIGN PATENT DOCUMENTS

| | | | |
|---|---|---|---|
| WO | 2018/193047 A1 | 10/2018 | |
| WO | WO-2018193047 A1 * | 10/2018 | .............. B60L 13/03 |

OTHER PUBLICATIONS

Hauser, G., "Hygienic Equipment Design Criteria," Second edition, Apr. 2004, Website: www.ehedg.org, Frankfurt, Germany, pp. 1-6.

* cited by examiner

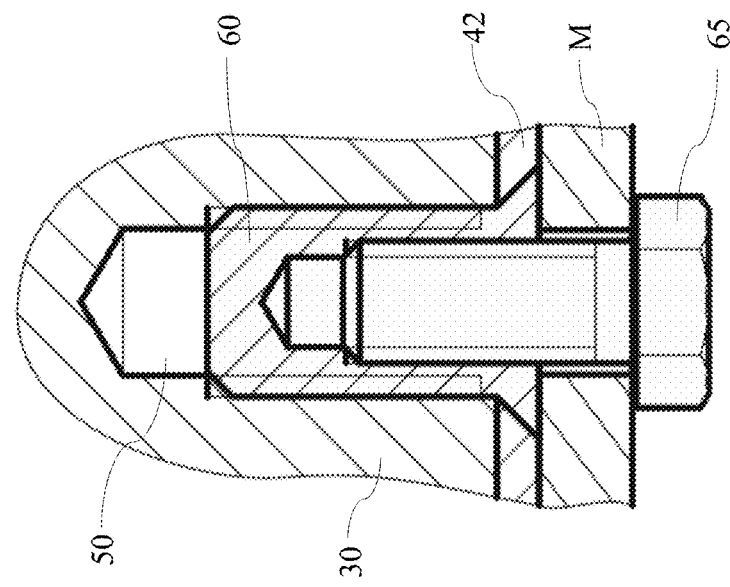
Fig. 3
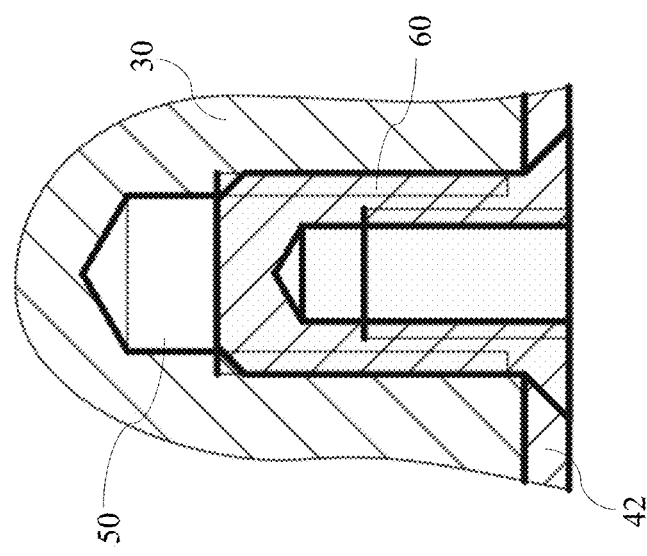
Fig. 5
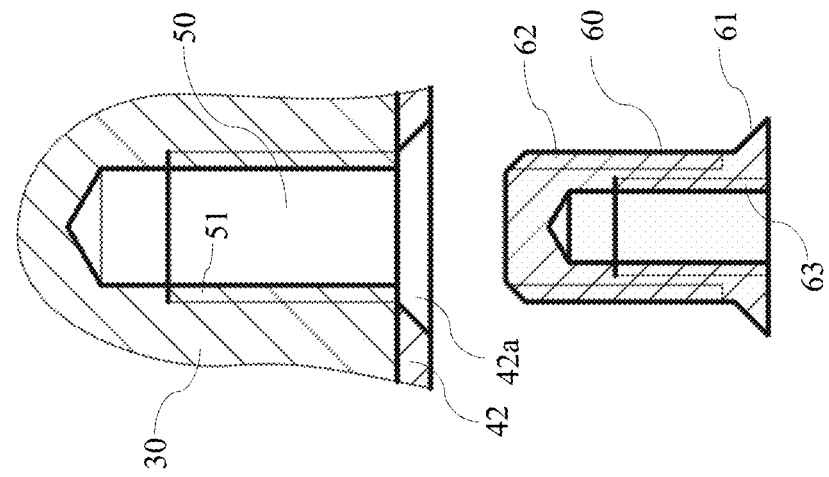
Fig. 4
Fig. 6

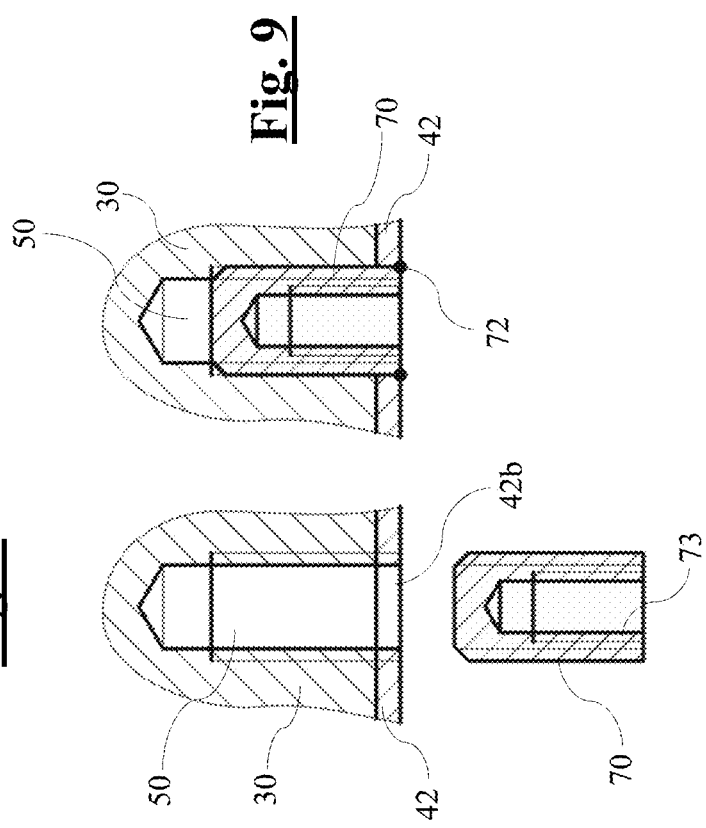

DRIVE DEVICE HAVING A TUBULAR LINEAR MOTOR AND A STAINLESS STEEL CASING

This application claims priority to European Patent Application No. EP 19195400.7, filed Sep. 4, 2019, the disclosure of which is incorporated by reference herein.

The present invention relates to a drive device having a tubular linear motor, a bottom flange and a stainless steel casing.

Rotative servo motors and various types of linear motors, especially tubular linear motors, are very widespread in the fields of handling technology and general mechanical engineering, such as, for example, packaging technology, food processing or special-purpose machine manufacturing. In the case of linear motors as in the case of rotative servo motors, permanent-magnet-excited synchronous motors have become established in the industrial sector on account of the dynamics, control quality and power density that are required.

The food industry, which includes both the processing sector and the food packaging sector, is becoming increasingly automated. Such automation has the aim, on the one hand, of increasing productivity and, on the other hand, of meeting the rising demands made of hygiene which, with a human workforce, often either cannot be achieved at all or can be achieved only with great effort. Especially in the field of milk, cheese, meat or poultry processing, the equipment must be cleaned and disinfected daily using aggressive cleaning agents. Such cleaning agents have a strong corrosive action both on normal construction steels and on aluminum or other customary materials. Accordingly, surface treatment processes have been introduced which, on the one hand, are to a certain extent able to withstand exposure to harsh cleaning agents and, on the other hand, exhibit a high degree of food compatibility. These include inter alia anodisation of aluminum, chemical nickel-plating of steel or the use of food-compatible two-component coatings. A problem common to all those processes is that in each case only a thin layer on the surface of the material has the desired protective action. As soon as the surface is scratched or damaged, the underlying material is attacked by the aggressive cleaning fluids and the food can become contaminated.

For that reason both the food-processing industry and legislators increasingly categorically prescribe that all surfaces of equipment or components used in this sector must be made from high-alloy stainless steel, it being necessary to note that in most cases only steels of material classes 1.44xx and 1.45xx (European Standard EN 10027-2) and materials AISI 316 and AISI 316L (AISI Standard of the American Iron and Steel Institute) are accepted. In the case of less critical applications, in some instances stainless steel of material classes 1.43xx (European Standard EN 10027-2) and AISI 304 (AISI Standard) is permitted. Hereinbelow the term stainless steel is always to be understood as meaning steels which meet those requirements. Solely sliding surfaces or plain bearings for the linear motors used are allowed to be realised from food-grade plastics (polymer bearings). Corresponding material requirements of course also apply to plugs, cables, cable outlets etc.

A tubular linear motor comprises a tubular stator (having a circular-cylindrical cross-section) and an armature (likewise having a circular-cylindrical cross-section) which is guided in linear bearings so as to be movable in the longitudinal direction in the stator. The stator comprises electric coils, a magnetic iron yoke encasing the latter, and a position sensor system for detecting the position of the armature relative to the stator. The stator is closed by sealing flanges at its two ends, the armature passing through those sealing flanges. The armature comprises a (circular-) cylindrical armature tube in which a column of permanent magnets is arranged and which is fluid-tightly closed at both of its ends by end parts made of stainless steel.

In terms of corrosion resistance with respect to acids or alkalis, the armature of such a linear motor is almost perfect, since for operational reasons the armature tube must anyway be made from a non-magnetic stainless steel.

The situation is different in the case of the stator. The yoke of the linear motor must be made from ferromagnetic iron. Although, in principle, it would be possible to do without the magnetic iron yoke, the motor would then suffer a massive loss of power. It is simpler to install the existing stator of a tubular linear motor directly in a stainless steel housing. Since tubular linear motors have a round cross-section, it is possible to use as housing simply a correspondingly large stainless steel tube into which the stator has been introduced. Accordingly, the sealing flanges at the two ends of the stator must then also be made of stainless steel. Depending upon requirements, the through-hole for the armature of the linear motor can be constructed with a can (i.e. tube) made of stainless steel or plastics. Linear motors constructed or corrosion-protected in that way have been known and successfully used for a number of years.

A considerable disadvantage of the arrangement of the tubular linear motor in a stainless steel tube lies in the thermal properties that result from the design of the housing or the motor. As is known, every electric motor, including a tubular linear motor, exhibits a power loss during operation which is dissipated in the form of heat. By far the greatest proportion of this power loss is generated by the ohmic losses in the coils of the motor. The full-load output of a tubular linear motor is directly associated with the possibility of dissipating that heat from the coils into the environment. Some of the heat is dissipated by means of air convection. That is to say, a motor having the largest possible surface area (for example cooling ribs of a cooling element) or a cooling fan would in principle be of great advantage. In the food industry, however, neither hard-to-clean cooling elements nor fans are acceptable. Liquid cooling by means of cooling coils which are installed directly in the housing of the linear motor is likewise not acceptable in many applications on account of the additional cooling circuit. Consequently most of the heat must be dissipated by direct connection of the linear motor or its stator to a machine frame on which the linear motor is mounted. In other words, this means that the machine frame on which the linear motor is mounted is used as the actual cooling element.

If the tubular linear motor is arranged in a stainless steel tube, however, the cylindrical design means that there is only a very small surface area available for cooling by air convection. In practice, all the waste heat from the linear motor must therefore flow in the longitudinal direction to the sealing flanges and is then—depending upon the type of mounting—dissipated to the machine frame via mounting flanges. Since both the tube and the sealing flanges and any mounting flanges have to be made from stainless steel, and stainless steel has very poor thermal conductivity, the full-load output of the motor has to be reduced by of the order of about 40% as compared with a motor not encapsulated in stainless steel.

In a design of tubular linear motor that is improved from the thermal standpoint, the stator of the linear motor is mounted over the entire length of its underside on a bottom flange made of stainless steel. A stainless steel covering in the form of a thin sheet is welded over the stator from the upper side and welded to the bottom flange. The sealing flanges are welded to the bottom flange and the stainless steel covering and sealed with respect to the inside by seals. The use of a covering in the form of a thin stainless steel sheet (from the upper side) has the advantage over a stainless steel tube that the total volume can be reduced and a substantially smaller amount of expensive stainless steel is required. The advantage from the thermal standpoint is that the heat is able to flow over the entire length of the stator and the coils directly through the bottom flange to the machine frame. Accordingly, it is possible to dissipate a very much larger amount of heat than with the variant described above in which the stator has been introduced into a stainless steel tube.

Such an arrangement has the disadvantage, however, that the stainless steel bottom flange used is very expensive and heavy. And even though the heat is conducted from the stator to the machine frame directly and over a large surface area, the disadvantage of the poor thermal conduction of stainless steel remains. This means that the height of the bottom flange and therefore the length of the thermal resistance through the bottom flange should be as small as possible. Since, however, the bottom flange is to have mounting bores (for mounting the linear motor on the machine frame), its height cannot be reduced as desired if the linear motor is at the same time to have the desired small width. That is to say, if the height (thickness) of the bottom flange is not sufficient to accommodate mounting bores therein, the linear motor can be mounted only via the sealing flanges. Such mounting only via the sealing flanges at both ends of the linear motor involves considerable structural constraints and is very inflexible. It is therefore undesirable.

Taking into account the remarks made above, a problem of the present invention is therefore to propose a drive device having a tubular linear motor which exhibits improved dissipation of heat, which has a comparatively lower weight and lower material and manufacturing costs, and which is not subject to any restrictions in respect of possible mounting methods and is absolutely corrosion-resistant.

The drive device according to the invention, which solves that problem, is characterised by the features of the independent claim. Advantageous aspects of the drive device according to the invention are subject matter of the dependent claims.

The drive device according to the invention comprises a tubular linear motor with a stator and an armature, and further with a bottom flange, the stator of the tubular linear motor being arranged on the bottom flange in thermal contact with the bottom flange. The stator of the tubular linear motor is fluid-tightly enclosed by stainless steel. The bottom flange consists at least partly of a material having a higher thermal conductivity than stainless steel. The stator of the tubular linear motor, together with the bottom flange, is enclosed by a casing made of stainless steel which is in thermal contact with the bottom flange and encloses the bottom flange and the tubular linear motor in common. The stator of the tubular linear motor is a tubular stator having drive coils arranged therein and also having a longitudinal axis and a through-hole which extends through the tubular stator coaxially with the longitudinal axis. The armature of the tubular linear motor has a fluid-tight armature tube made of stainless steel, in which permanent magnets are arranged, and is arranged so as to be movable relative to the tubular stator in the through-hole in the direction of the longitudinal axis. The tubular stator and the bottom flange are so arranged relative to one another that a portion of the tubular stator is in thermal contact with the bottom flange.

In this way the tubular linear motor is of entirely fluid-tight construction so that fluid is present neither inside the stainless steel casing nor inside the stator or the armature of the tubular linear motor nor is able to penetrate therein. At the same time, significantly improved thermal dissipation is achieved. That entirely fluid-tight construction also includes the construction of the bearing arrangement of the armature of the tubular linear motor in such a way that fluid can penetrate neither into the interior of the stainless steel casing nor into the stator or into the armature of the tubular linear motor, so that absolute corrosion resistance is achieved.

In accordance with an aspect of the drive device according to the invention, the device can comprise two sealing flanges consisting of stainless steel which are arranged at the two ends of the casing, the casing being fluid-tightly welded to the two sealing flanges.

In accordance with a further aspect of the drive device according to the invention, the casing is in the form of sheet metal having a thickness of from 0.3 mm to 0.7 mm (for example having a thickness of 0.5 mm). As a result, good thermal dissipation is ensured while, at the same time, the casing has sufficient stability.

In accordance with a further aspect of the drive device according to the invention, the casing can be composed of two or more cover parts which are fluid-tightly joined (for example welded) to one another. This facilitates assembly, because the two or more cover parts can initially be mounted separately and then joined (for example welded) to one another in order to form the casing.

In accordance with a further aspect of the drive device according to the invention, the material of which the bottom flange at least partly consists can be an aluminum alloy. Such an alloy has high thermal conductivity, is relatively lightweight, and is economical and easy to process.

In accordance with a further aspect of the drive device according to the invention, in the bottom flange there can be provided at least one mounting arrangement for mounting the drive device on a mounting frame. Such mounting arrangements in the bottom flange provide a high degree of flexibility for mounting the drive device on a mounting frame (machine frame).

In accordance with a further aspect of the drive device according to the invention, the casing can have at least one opening, and the at least one mounting arrangement can have a respective bore in the bottom flange. The respective opening in the casing is arranged coaxially with the respective bore in the bottom flange. The respective mounting arrangement also has a threaded bushing inserted into the bore, the bushing extending through the opening in the casing into the bore and joining the casing fluid-tightly to the bottom flange. In this way, aggressive fluids are prevented from being able to penetrate into the casing.

In accordance with a further aspect of the drive device according to the invention, the bore can be in the form of a threaded bore having an internal thread, the threaded bushing having an external thread and being screwed into the bore. The threaded bushing has a conical head which presses the casing fluid-tightly against the bottom flange. As a result, an especially tightly sealed design is obtained.

In accordance with a further aspect of the drive device according to the invention, the opening can be conically countersunk in the casing.

In accordance with a further aspect of the drive device according to the invention, the threaded bushing can be fluid-tightly welded to the rim of the opening in the casing.

In accordance with a further aspect of the drive device according to the invention, the at least one mounting arrangement can have a respective bore provided with an internal thread in the bottom flange, and the casing can have at least one opening, the respective opening being arranged coaxially with the respective bore and having a larger diameter than the respective bore, and a sealing ring being arranged in the respective opening, which sealing ring fluid-tightly seals the casing with respect to the bottom flange.

In accordance with a further aspect of the drive device according to the invention, the bottom flange can comprise a plurality of sections which consist alternately of stainless steel and the material having a higher thermal conductivity than stainless steel. The casing is fluid-tightly welded to the sections of the bottom flange that consist of stainless steel. In each of the sections of the bottom flange that consist of stainless steel there is arranged at least one bore which is provided with an internal thread. As a result, the mounting of the drive device on a mounting frame (for example the machine frame) is especially easy to realize.

In accordance with a further aspect of the drive device according to the invention, the stainless steel can be a stainless steel having the material name 1.43xx, 1.44xx or 1.45xx (European Standard EN 10027-2). This applies to all parts of the drive device according to the invention that consist of stainless steel.

In accordance with a further aspect of the drive device according to the invention, that portion of the bottom flange which consists of the aluminum alloy can be made from a drawn profile made from the aluminum alloy. This is especially simple in manufacturing terms, because the bottom flange can be produced from such a drawn profile by simply cutting off from such a profile the length of profile (part) required for the bottom flange. As profile there can be used, for example, a drawn profile made of the aluminum alloy AlMgSi0.5 having the material name EN AW-6060 T66 (EN=European Standard). A different material name for this is 3.3206 (Aluminum Association).

Exemplary embodiments of the invention are described hereinbelow with reference to the drawing, wherein:

FIG. 3-6 are detail views of an exemplary embodiment of the mounting arrangement of a drive device according to the invention;

FIG. 7-9 are detail views of a further exemplary embodiment of the mounting arrangement of a drive device according to the invention;

The following remarks apply in respect of the following description: where, for the purpose of clarity of the drawings, reference symbols are included in a Figure but are not mentioned in the directly associated part of the description, reference should be made to the explanation of those reference symbols in the preceding or subsequent parts of the description. Conversely, to avoid overcomplication of the drawings, reference symbols that are less relevant for immediate understanding are not included in all Figures. In that case, reference should be made to the other Figures. As stainless steel there is used in the described exemplary embodiments non-magnetic stainless steel having the material names 1.43xx, 1.44xx and 1.45xx (European Standard EN 10027-2) or having the material names AISI 304, AISI 316 and AISI 316L (in accordance with the AISI Standard of the American Iron and Steel Institute).

Figure 1:
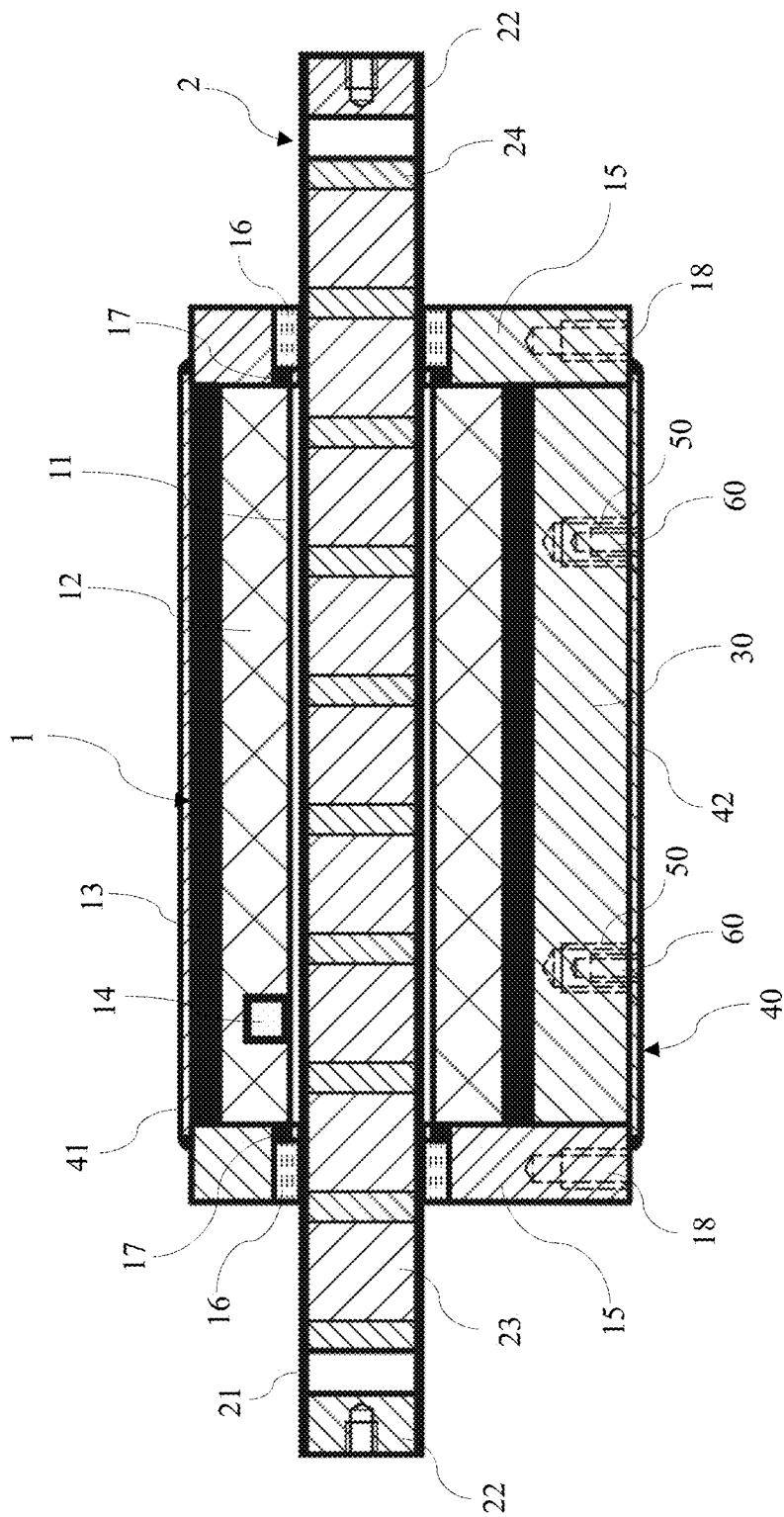
FIG. 1 shows a longitudinal section through a first exemplary embodiment of a drive device according to the invention having a tubular linear motor.
Figure 2:
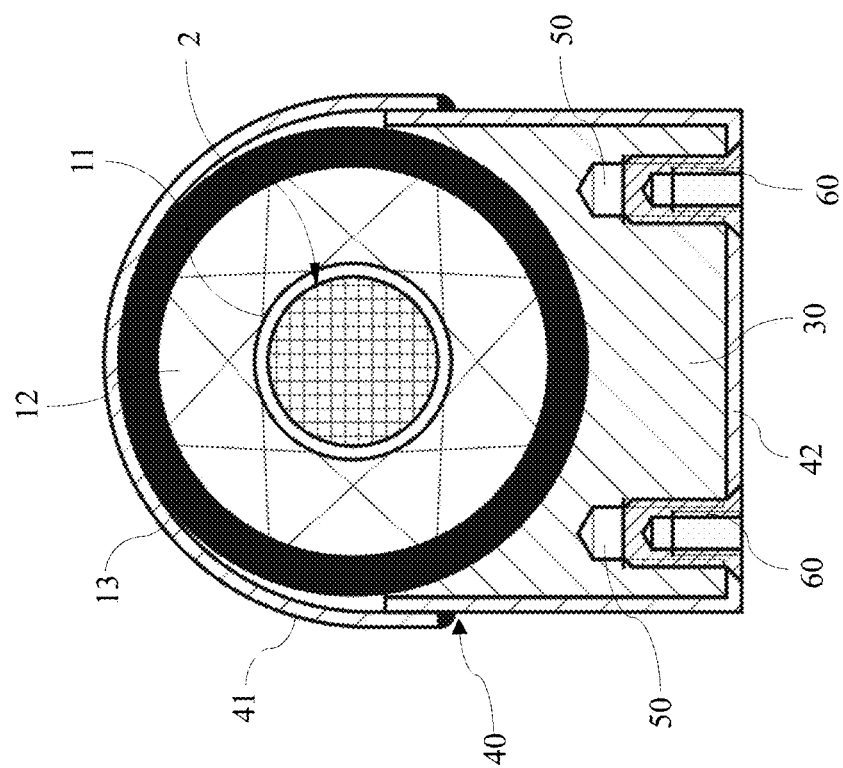
FIG. 2 shows a cross-section through the drive device of FIG. 1 perpendicular to the longitudinal axis.

The tubular linear motor of the drive device according to the invention shown in FIG. 1 and FIG. 2 comprises a stator 1 and an armature 2. The stator 1 is a tubular stator having a coaxial through-hole 11 and comprises drive coils 12, an iron yoke 13 encasing the drive coils, and a position sensor system 14.

The armature 2 comprises an armature tube 21 made of stainless steel which is fluid-tightly closed at each of its two ends by an end part 22 made of stainless steel. In the interior of the armature tube 21 there are arranged permanent magnets 23 and spacers, for example in the form of iron discs 24.

Mounted on the two longitudinal ends of the stator 1 are two sealing flanges 15, likewise consisting of stainless steel, in each of which there is arranged a linear plain bearing 16 which is fluid-tightly sealed with respect to the interior of the stator 1 by means of a respective seal 17. In addition, the two sealing flanges 15 are provided with threaded bores 18 which can serve as possible ways of mounting the drive device on a machine frame not described herein.

The armature 2 is mounted in the linear plain bearings 16 so as to be movable relative to the stator 1 in the direction of the longitudinal axis of the stator 1, the position of the armature 2 relative to the stator 1 being detected by the position sensor system 14. Electrical connections for the coils 12 and the position sensor system 14 as well as a controller for the tubular linear motor are not relevant to the understanding of the invention and are not shown in the interests of better clarity.

In principle the armature 2 can also be mounted externally (for example with the aid of guide rods of an H-guide means) so that the plain bearings 16 can in principle be omitted or can be configured as emergency plain bearings having a relatively large diameter.

Instead of the two linear plain bearings 16 or in addition thereto, the inner surface of the through-hole 11 of the stator 1 can be in the form of a polymeric sliding surface. The advantage of the plain bearings 16 is that they can be exchanged.

Alternatively, it is also possible to install a can (i.e. tube) made of stainless steel in the stator 1. This is then joined sealingly to each of the sealing flanges 15, for example by a welded connection. The armature 2 is then mounted in linear bearings inside that can and never touches the can itself. Accordingly, the air gap between the drive coils 12 and the permanent magnets 23 in the armature 2 is then slightly larger, or the diameter of the armature is slightly reduced.

Thus far the tubular linear motor described corresponds to known tubular linear motors in terms of structure and mode of operation, so that the person skilled in the art needs no further explanations in relation to the further structure and mode of operation of such a tubular linear motor.

In the tubular linear motor of the drive device according to the invention, part of the tubular stator 1, with its tubular iron yoke 13, is mounted on a bottom flange 30, the contour of the inner surface of the bottom flange 30 being matched to the outer contour of the iron yoke 13, so that there is good thermal contact between those two parts. In this exemplary embodiment the bottom flange 30 consists of a uniform block made of a material that has a higher thermal conductivity than stainless steel, is easier to process than stainless steel and has a lower weight than stainless steel. Preferably the bottom flange 30 consists of an aluminum alloy having high thermal conductivity. A suitable aluminum alloy is, for example, the aluminum alloy AlMgSi0.5 already mentioned hereinabove having the material name EN AW-6060 T66 (EN=European Standard) or the material name 3.3206 (Aluminum Association). The bottom flange 30 extends between the two sealing flanges 15 over the entire length of the stator 1 or the iron yoke 13 thereof. The bottom flange can also comprise two or more block parts arranged one next to the other. Although, for example, copper would be preferable from the thermal standpoint, the greater weight, the more difficult processibility and the greater costs of copper in comparison with an aluminum alloy are disadvantageous.

The specific weight of stainless steel is about three times greater than that of aluminum and about five to six times greater than that of customary plastics. The thermal conductivity of an aluminum alloy is about ten to fifteen times greater than that of stainless steel. And finally the material and processing costs of a part made from stainless steel are a multiple higher than when the part is made from an aluminum alloy or from plastics.

The iron yoke 13 of the stator 1 of the drive device according to the invention, together with the bottom flange 30, is enclosed by a casing 40 in the form of a sheet of stainless steel. The casing 40 is fluid-tightly welded to the two sealing flanges 15 (likewise made of stainless steel), so that the entire tubular linear motor is fluid-tightly encapsulated. For reasons of easier manufacture, the stainless steel casing 40 can be of two-part construction with an upper cover part 41 and a lower cover part 42, the upper cover part 41 being fluid-tightly welded to the lower cover part 42. In principle, instead of welding it is possible to use some other (corrosion-resistant) joining technique. Welding to the sealing flanges 15 is carried out after the two cover parts 41 and 42 have been welded to one another. The wall thickness of the casing 40, i.e. the thickness of the stainless steel sheet used therefor, should be as small as possible on account of the poor thermal conductivity of stainless steel, but should nevertheless ensure that the casing has sufficient strength. Preferred suitable sheet thicknesses are in the range of, for example, 0.3-0.7 mm (they can be, for example, 0.5 mm).

The arrangement for mounting the drive device according to the invention on a machine frame or a mounting plate or the like will be discussed in greater detail below.

In principle, the drive device according to the invention can be mounted on the machine frame by means of the threaded bores 18 provided in the sealing flanges 15. From the viewpoint of the user, however, this is in many cases very disadvantageous and mounting points in the region between the two sealing flanges 15 are desirable or even necessary.

A simple bore through the thin-walled lower cover part 42 of the casing 40 into the bottom flange 30 (at that location in the bottom flange 30, for example, having an internal thread) would have the result, however, that cleaning fluid could pass to the bottom flange 30 through the bore in the casing 40, and the bottom flange 30, because it is not made of stainless steel, would corrode. An interface having a capillary action would form between the lower cover part 42 and the bottom flange 30 so that cleaning fluid passing through the bore in the casing 40 is drawn in between the thin-walled cover part 42 and the bottom flange 30 and so would result in damage to the motor.

In an exemplary embodiment of the mounting arrangement of the drive device according to the invention shown in FIG. 3-FIG. 6, (one or more) bores 50 having an internal thread 51 (FIG. 3) are provided in the bottom flange 30 through openings 42a in the lower cover part 42 of the (stainless steel) casing 40, those bores 50 in the bottom flange 30 being arranged coaxially with the respective openings 42a in the (stainless steel) casing 40. A threaded bushing 60 made of stainless steel—as shown in FIG. 4—has been inserted into each of the internally threaded bores 50, as can be seen from FIG. 5. The bores 50, together with the threaded bushings 60 inserted therein, form mounting arrangements for mounting the drive device on the machine frame. The threaded bushings 60 consist of stainless steel and have a conical head 61.

The threaded bushings 60 each have an external thread 62 and an internal thread 63, the external thread 62 matching the internal thread 51 of the bores 50 in the bottom flange 30. FIG. 6 shows how the drive device is mounted on the machine frame M by means of a screw 65 screwed into a threaded bushing 60. That screw 65 preferably likewise consists of stainless steel.

For insertion of a threaded bushing, firstly a cylindrical bore 50 is drilled through the lower cover part 42 of the (stainless steel) casing 42 into the bottom flange 30 and then an internal thread 51 is cut into the bore in the bottom flange. The external thread 62 of the threaded bushing 60 exactly matches that internal thread 51 of the bore 50. The opening 42a is then countersunk conically in the (stainless steel) casing 40 corresponding to the shape of the head 61 of the threaded bushing 60, advantageously having an opening angle of in total 90° (degrees). The threaded bushing 60 is then, using a liquid screw-locking device (thread adhesive), non-detachably screwed in until the conical end of the threaded bushing 60 strikes the countersink of the opening 42a in the lower cover part 42 of the casing 40. For screwing in the threaded bushing 60, it is possible to use an auxiliary screw or a suitable tool which is screwed into the internal thread 63 of the threaded bushing 60, or a corresponding receptacle, for example a hexagonal socket, can be provided inside the threaded bushing 60 (not shown). As a result of the contact pressure of the conical head 61 against the lower cover part 42 of the (stainless steel) casing 40 in the region of the bore 50, the conical head 61 of the threaded bushing 60 provides a fluid-tight seal between the casing 40 and the bottom flange 30. That contact pressure is achieved also when the internal thread 63 in the threaded bushing 60 is exposed and has not been screwed onto a machine frame or a mounting plate with a screw. In comparison with the exemplary embodiment described below in which the threaded bushings are welded in position, this variant has the great advantage that laser seam welding can be omitted and, also, threads can be made at locations which cannot be reached by a welding laser.

FIG. 7-9 shows a further exemplary embodiment of the mounting arrangement of the drive device according to the invention in which threaded bushings 70 made of stainless steel having an internal thread 73—as shown in FIG. 7—have been inserted through openings 42b in the lower cover part 42 of the (stainless steel) casing 40 into bores 50 in the bottom flange 30—as shown in FIG. 8. The inserted state, that is to say the state in which the threaded bushing 70 is installed in the bore 50, can be seen in FIG. 9. The bores 50, together with the inserted threaded bushings 70, form mounting arrangements for mounting the drive device according to the invention on a machine frame or a mounting plate or the like, it being possible for the threaded bushings 70 to be adhesively bonded or clamped in the bores 50. The bores 50 can also be in the form of threaded bores having an internal thread, the threaded bushings 70 in that case being provided with a matching external thread and being screwed into the bores. The threaded bushings 70 are in each case fluid-tightly welded, for example by means of laser welding, to the rim of the openings 42b in the lower cover part 42, thus achieving an absolutely fluid-tight connection between the threaded bushings 70 and the lower cover part 42 of the (stainless steel) casing. Such a welded seam 72 is indicated in FIG. 9. The tubular linear motor can thus be mounted on the machine frame, or demounted again therefrom, without further provisions or sealing rings, the sealing action being retained even without a mounting screw or mounting tool. In that case, however, a seam welding operation with subsequent after-treatment is necessary.

Figure 11:
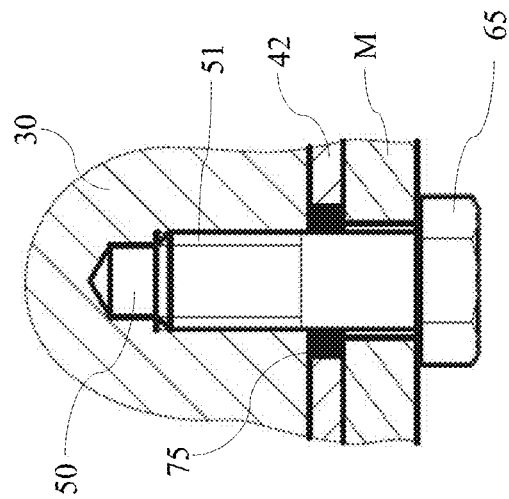
FIG. 10-11 are detail views of a further exemplary embodiment of the mounting arrangement of a drive device according to the invention.
Figure 10:
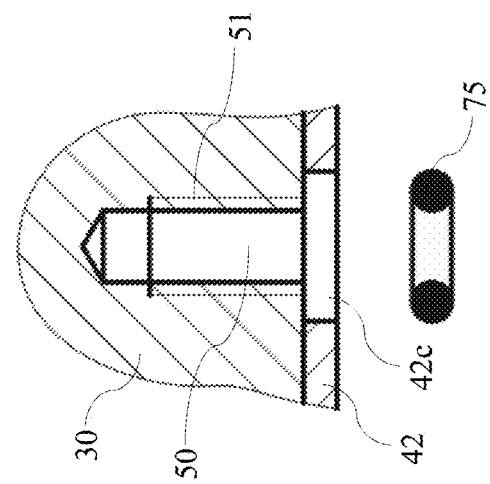

FIG. 10 and FIG. 11 show a further exemplary embodiment of the mounting arrangement of the drive device according to the invention. In this exemplary embodiment one or more bores 50 having an internal thread 51 are again provided in the bottom flange 30, and the lower cover part 42 of the (stainless steel) casing 40 has a corresponding number of openings 42c, the (internal) diameter of which is greater than the (internal) diameter of the bores 50, as can be seen from FIG. 10. A sealing ring 75 (O-ring), as can likewise be seen in FIG. 10, has been inserted into each opening 42c, the sealing ring 75 (O-ring) inserted in the opening 42c being shown in FIG. 11. During mounting of the drive device on the machine frame M by means of a mounting screw 65 made of stainless steel, the sealing ring 75 is squashed and seals the lower cover part 42 of the stainless steel casing 40 with respect to the bottom flange 30. Alternatively, it would also be possible in principle for the openings having the larger (internal) diameter also to be provided in the machine frame M and for the sealing rings to be arranged in those openings in the machine frame M. The sealing action comes into effect, however, only once the drive device has been firmly screwed onto the mounting plate 43. In practice, that kind of sealing is therefore less suitable if individual threaded bores remain unused or for purposes in which the mounting screws need to be loosened again.

Figure 12:
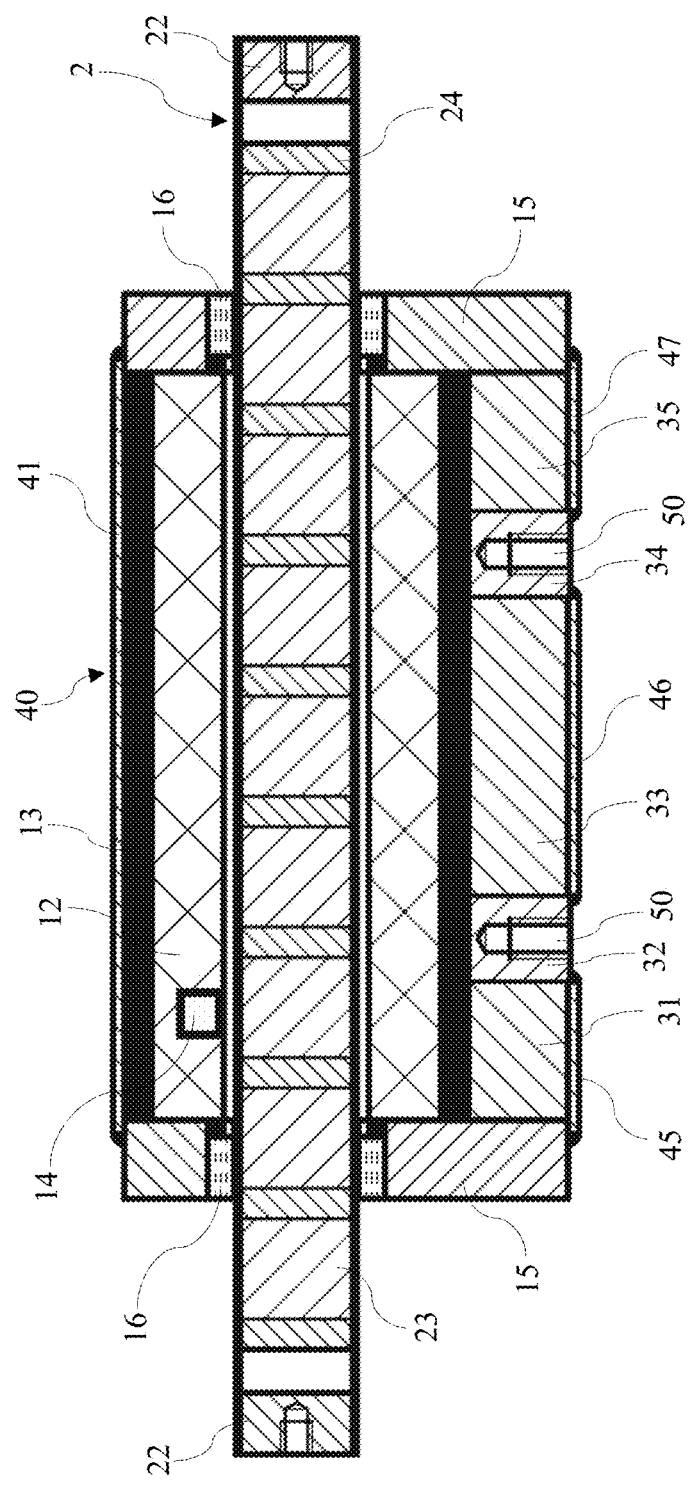
FIG. 12 shows a longitudinal section through a further exemplary embodiment of the drive device according to the invention having a tubular linear motor.

FIG. 12 shows an exemplary embodiment of the drive device according to the invention in which the problem of mounting the drive device on the machine frame has been solved in a different way. The tubular linear motor shown herein differs from the tubular linear motor shown in FIG. 1 and FIG. 2 solely in the way in which the bottom flange and the (stainless steel) casing are constructed. All other parts are identical.

In this exemplary embodiment, the bottom flange comprises five flange parts 31, 32, 33, 34 and 35, which are arranged between the two sealing flanges 15 one after the other in the longitudinal direction of the tubular linear motor. As in the exemplary embodiment from FIG. 1 and FIG. 2, the longer flange parts 31, 33 and 35 of the bottom flange consist of an aluminium alloy having good thermal conductivity, while the shorter flange parts 32 and 34 arranged between those longer flange parts 31, 33 and 35 consist of stainless steel. The lower cover part of the (stainless steel) casing comprises three (casing) sections 45, 46 and 47, which on the one hand enclose the flange parts 31, 33 and 35 consisting of the aluminum alloy and on the other hand partly overlap the flange parts 32 and 34 consisting of stainless steel. The middle (casing) section 46 encloses the flange part 33 of the bottom flange, which consists of the aluminum alloy, and partly overlaps the two flange parts 32 and 34 of the bottom flange which consist of stainless steel, with each of which the (casing) section 46 is fluid-tightly welded. One outer (casing) section 45, which likewise consists of stainless steel, encloses the flange part 31 of the bottom flange, which consists of the aluminum alloy, and partly overlaps both the one sealing flange 15, which consists of stainless steel, and the flange part 32 of the bottom flange which consists of stainless steel. That one outer (casing) section 45 is fluid-tightly welded both to that sealing flange 15 and to the flange part 32 of the bottom flange. The corresponding other outer (casing) section 47, which likewise consists of stainless steel, encloses the flange part 35 of the bottom flange, which consists of the aluminum alloy, and partly overlaps both the other sealing flange 15, which consists of stainless steel, and the flange part 34 of the bottom flange which consists of stainless steel. That other outer (casing) section 47 is welded both to that other sealing flange 15 and to the flange part 34. Bores 50 having an internal thread are provided in the flange parts 32 and 34 of the bottom flange which consist of stainless steel, which bores serve as mounting arrangements for the drive device. Since the flange parts 32 and 34 consist of stainless steel of a sufficient thickness, threaded bores can be provided therein without problems. Instead of the lower cover part of the (stainless steel) casing being divided into three sections, the lower cover part can also consist of a single section, but it is then necessary for openings to be provided in that casing in the region of the mounting arrangement and for the rims of those openings to be fluid-tightly welded to the flange parts 32 and 34 of the bottom flange which consist of stainless steel or to be sealed in some other way.

In the exemplary embodiment according to FIG. 12, the dissipation of heat is slightly reduced in comparison with an exemplary embodiment having a bottom flange consisting entirely of an aluminum alloy, but the realisation of the mounting arrangement is somewhat simpler. In the interests of the best possible dissipation of heat as well as a low weight and lower material costs, the length of the flange parts 32 and 34 that consist of stainless steel is as short as possible and of a size just sufficient to be able to reliably accommodate the threaded bores. It will be understood that the bottom flange can also have only a single flange part made of stainless steel or more than two flange parts made of stainless steel.

The invention has been described above with reference to exemplary embodiments, but is not limited to those exemplary embodiments; rather, changes or modifications are possible which lie within the knowledge of a person skilled in the art and which are therefore covered by the technical teaching on which the invention is based. The scope of protection is accordingly defined by the following claims.

The invention claimed is:

1. A drive device comprising:
   a tubular linear motor with a stator and an armature; and
   a bottom flange,
   wherein the stator of the tubular linear motor is arranged on the bottom flange in thermal contact with the bottom flange,
   wherein the stator of the tubular linear motor is fluid-tightly enclosed by stainless steel,
   wherein, further, the bottom flange consists at least partly of a material having a higher thermal conductivity than stainless steel,
   wherein the stator of the tubular linear motor, together with the bottom flange, is enclosed by a casing made of stainless steel which is in thermal contact with the bottom flange and encloses the bottom flange and the stator of the tubular linear motor in common, wherein the stator of the tubular linear motor is a tubular stator having drive coils arranged therein and also having a longitudinal axis and a through-hole which extends through the tubular stator coaxially with the longitudinal axis, wherein the armature of the tubular linear motor has a fluid-tight armature tube made of stainless steel in which permanent magnets are arranged, the armature being arranged so as to be movable relative to the tubular stator in the through-hole in the direction of the longitudinal axis, and wherein the tubular stator and the bottom flange are so arranged relative to one another that a portion of the tubular stator is in thermal contact with the bottom flange.

2. The drive device according to claim 1, further comprising two sealing flanges consisting of stainless steel which are arranged at the two ends of the casing, the casing being fluid-tightly welded to the two sealing flanges.

3. The drive device according to claim 1, wherein the casing is in the form of sheet metal having a thickness of 0.3 mm-0.7 mm.

4. The drive device according to claim 1, wherein the casing is composed of two or more cover parts which are fluid-tightly joined to one another.

5. The drive device according to claim 1, wherein a material of which the bottom flange at least partly consists is an aluminum alloy.

6. The drive device according to claim 1, wherein in the bottom flange there is provided at least one mounting arrangement for mounting the drive device on a mounting frame.

7. The drive device according to claim 6, wherein the casing has at least one opening, wherein the at least one mounting arrangement has a respective bore in the bottom flange, wherein the respective opening in the casing is arranged coaxially with the respective bore in the bottom flange, and wherein the respective mounting arrangement has a threaded bushing inserted into the bore, the bushing extending through the opening in the casing into the bore and joining the casing fluid-tightly to the bottom flange.

8. The drive device according to claim 7, wherein the bore is in the form of a threaded bore having an internal thread, the threaded bushing having an external thread and being screwed into the bore, and wherein the threaded bushing has a conical head which presses the casing fluid-tightly against the bottom flange.

9. The drive device according to claim 8, wherein the opening is conically countersunk in the casing.

10. The drive device according to claim 7, wherein the threaded bushing is fluid-tightly welded to the rim of the opening in the casing.

11. The drive device according to claim 6, wherein the at least one mounting arrangement has a respective bore provided with an internal thread in the bottom flange, and the casing has at least one opening, the respective opening being arranged coaxially with the respective bore and having a larger diameter than the respective bore, and wherein a sealing ring is arranged in the respective opening, the sealing ring fluid-tightly sealing the casing with respect to the bottom flange.

12. The drive device according to claim 1, wherein the bottom flange comprises a plurality of sections which consist alternately of stainless steel and the material having the higher thermal conductivity than stainless steel, wherein the casing is fluid-tightly welded to the sections of the bottom flange that consist of stainless steel, and wherein in each of the sections of the bottom flange that consist of stainless steel there is arranged at least one bore which is provided with an internal thread.

13. The drive device according to claim 1, wherein the stainless steel is a stainless steel having the material name 1.43xx, 1.44xx or 1.45xx.

14. The drive device according to claim 5, wherein a portion of the bottom flange which consists of the aluminum alloy is made from a drawn profile made from the aluminium alloy.

* * * * *